United States Patent [19]
Bouhier

[11] Patent Number: 4,869,475
[45] Date of Patent: Sep. 26, 1989

[54] HYDRAULIC ANTIVIBRATORY SUPPORT SLEEVES

[75] Inventor: Bernard Bouhier, Vierzon, France

[73] Assignee: Hutchinson, France

[21] Appl. No.: 228,208

[22] Filed: Aug. 4, 1988

[30] Foreign Application Priority Data

Aug. 4, 1987 [FR] France ............................ 87 11057

[51] Int. Cl.$^4$ ............................................. F16F 5/00
[52] U.S. Cl. .................................. 267/140.1; 267/219
[58] Field of Search ............... 248/562; 267/219, 220, 267/140.1

[56] References Cited

U.S. PATENT DOCUMENTS 4,749,174 6/1988 Kanda .............................. 267/140.1

FOREIGN PATENT DOCUMENTS 3140783 4/1983 Fed. Rep. of Germany ... 267/140.1
0175834 9/1985 Japan ................................ 267/140.1
0118131 5/1987 Japan ................................ 267/140.1

*Primary Examiner*—Duane A. Reger
*Attorney, Agent, or Firm*—Larson and Taylor

[57] ABSTRACT

The invention provides a hydraulic antivibratory support sleeve comprising two rigid tubular frames (1, 2) one surrounding the other and joined together by an elastomer body (3) adhered thereto and adapted so as to form therewith at least two diametrically opposite sealed chambers (A, B) communicating together through a narrow channel (E), the whole of said chambers and said channel being filled with a damping liquid. The median portion of its internal frame (1) comprises a rigid seat for a mobile or deformable valve (6, 10), which valve has two opposite surfaces placed respectively in direct contact with the liquid volumes contained respectively in both chambers (A, B). The amplitude of the deflection movements of this valve are limited.

1 Claim, 2 Drawing Sheets

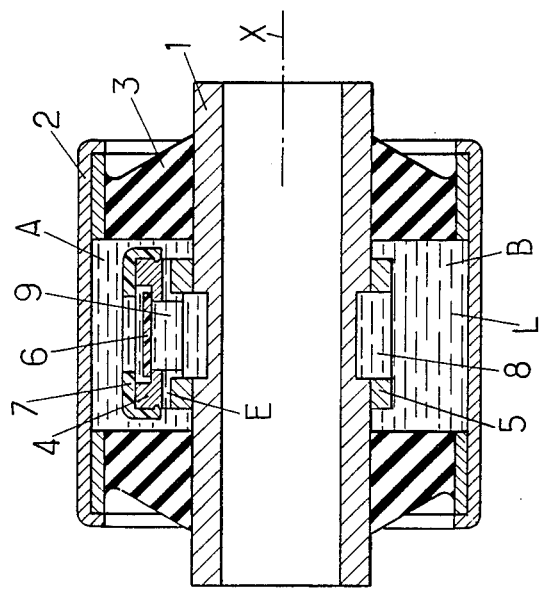
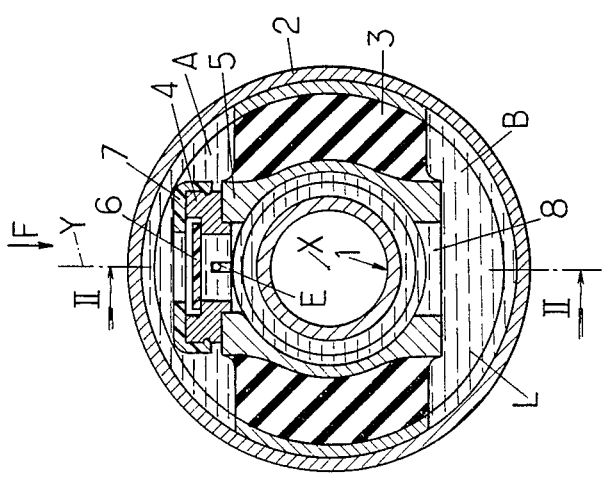

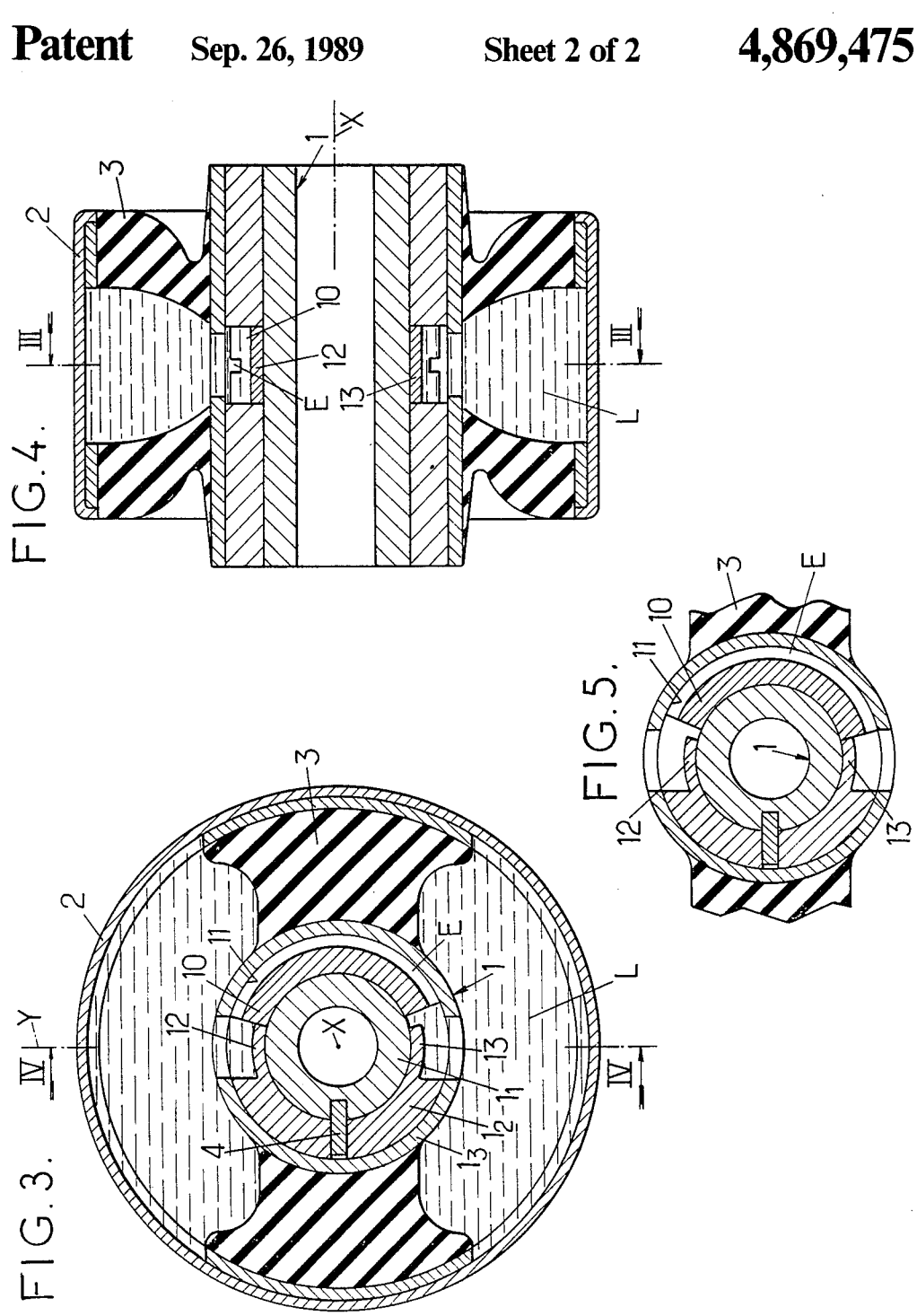

HYDRAULIC ANTIVIBRATORY SUPPORT SLEEVES

The invention relates to hydraulic antivibratory support sleeves comprising two rigid tubular frames one surrounding the other and preferably of revolution at least partially, coaxial and concentric at least under load, which frames are joined together by an elastomer body adhered thereto and adapted so as to form therewith at least two sealed chambers diametrically opposite in a direction Y and communicating therebetween through a narrow channel, the whole of said chambers and said channel being filled with a damping liquid.

Such sleeves are intended to be fitted for support and damping purposes between two rigid parts able to be firmly secured respectively to the two frames and able to be subjected with respect to each other to oscillations oriented in the diametrical direction Y, the assembly being arranged so that, for some at least of these oscillations, the liquid is driven alternately from one of the chambers to the other and conversely through the narrow channel, which creates in this liquid, for some oscillation frequencies, a resonance phenomenon capable of damping the transmission of these oscillations from one of the frames to the other.

Such sleeves with diametrical deflection movements are for example intended to be fitted between a vehicle chassis and the internal combustion engine or the front or rear undercarriage of this vehicle.

For providing the above mentioned support and damping, another type of hydraulic device is known with an axial and not diametrical range of deflection movements having a construction of revolution about a generally vertical axis, the direction in which the oscillations to be damped appear being that of this axis.

These supports further comprise two sealed deformable chambers communicating together through a narrow channel, one of these two chambers, generally defined outwardly by a thick truncated cone shaped wall, being called "work chamber" whereas the other, essentially defined by a flexible foil, is called "compensation chamber".

It has been proposed to equip these other supports with "high frequency decoupling" means, i.e. for filtering out the vibrations of relatively low amplitude (generally less than 0.5 mm) and of relatively high frequency (generally greater than 15 Hz) such as those due to the operation of a vehicle internal combustion engine.

These means comprise a movable or deformable "valve" defining a portion of the work chamber, this portion being situated at the level of the outer wall of said chamber or at the level of a central dividing wall separating the two chambers.

Attempts have been made to apply such decoupling means to the diametrical deflection movement sleeves such as defined above.

Thus, the European patent No. 0 172 700 has proposed forming a portion of the outer wall of one of the two chambers of such a sleeve by a deformable membrane encaged between two rigid grids for the purpose of limiting its range of deflection movements. Such an approach has the drawback that in the case of breakage or leakage of the membrane, the liquid contained in the sleeve escapes to the outside, which makes the sleeve inoperative.

Because of the special construction of the sleeves considered, whose central portion is occupied by the internal tubular frame, it was not considered possible up to now to adopt for such chambers the solution of the central valve known for axial deflection supports.

An object of the invention is to make it possible to adopt such a solution in hydraulic antivibratory sleeves of the diametrical deflection kind considered.

For this, the sleeves of the kind in question in accordance with the invention are essentially characterized in that the median portion of their internal frame comprises a rigid seat for a mobile or deformable valve, which valve has two opposite surfaces placed respectively in direct contact with the liquid volumes contained respectively in both chambers, and means for limiting the amplitude of the deflection movements of this valve.

In preferred embodiments, recourse is further had to one and/or other of the following arrangements:

the narrow channel is also comprised by the median portion of the internal frame, a rigid ring is sealingly fitted to the outer lateral face of the median portion of the internal frame so as to be immersed in one of the two chambers, the axis of this ring extending in the diametrical direction Y, the valve is mounted over the opening of this ring, adapted as a double valve seat, and a large section passage is provided along the median portion of the internal frame so as to cause the chamber in which the ring is not immersed to communicate freely with the inside of this ring, in a sleeve according to the two preceding paragraphs, the narrow channel is formed radially in the ring, a passage in the form of a cylindrical tile whose axis coincides with that of the internal frame is formed in the median portion of this frame and a valve in the form of a cylindrical tile is mounted so as to be able to slide angularly in this passage and to expose its two side edges respectively to the liquid volumes contained in the two chambers, in a sleeve according to the preceding paragraph, the narrow channel is defined essentially by a groove extending along an arc of a circle and formed between the tile shaped valve and its housing.

The invention comprises, apart from these main arrangements, certain other arrangements which are preferably used at the same time and which will be more explicitly discussed hereafter.

In what follows, two preferred embodiments of the invention will be described with reference to the accompanying drawings in a way which is of course in no wise limitative.

FIGS. 1 and 2 of these drawings show a first hydraulic antivibratory support sleeve formed in accordance with the invention, respectively in cross section through I—I of FIG. 2 and in axial section through II—II of FIG. 1, FIGS. 3 and 4 show a second sleeve also in accordance with the invention, respectively in cross section through III—III of FIG. 4 and in axial section through IV—IV of FIG. 3.

FIG. 5 shows a portion of FIG. 3 with a different position of the corresponding valve.

In a way known per se, the support sleeve comprises in each case:

a tubular internal metal frame of revolution 1 whose axis X is generally horizontal, a tubular external metal frame of revolution 2 coaxial with frame 1 at least in the assembled and loaded condition of the sleeve and surrounding this frame 1, and an elastomer body 3 connecting the two frames 1 and 2 together while forming therebetween two sealed chambers A, B diametrically opposite in a generally vertical direction Y.

The internal frame 1 is intended to be secured to a pin (not shown) which passes jointingly therethrough whereas the external frame 2 is intended to be secured to a bearing (not shown), this pin and this bearing being fixed respectively to two rigid elements between which it is desired to fit an antivibratory support, elements such as a vehicle engine or suspension arm and the chassis of this vehicle.

The two chambers A and B communicate together through a narrow channel E which will be discussed further on.

These two chambers and the narrow channel are filled with a liquid L.

The operation of such a support sleeve is as follows.

At rest, the sleeve is in is condition shown in the drawings.

If, from this situation, a force is applied to the external frame 2, with respect to the internal frame 1, in the direction Y shown by arrow F, chamber A shrinks by crushing whereas chamber B expands: the liquid L initially contained in chamber A is then driven into chamber B through the narrow channel E.

This effect is reversed as soon as a force is applied in a direction opposite the preceding one to frame 2.

The alternation of these forces is generally renewed at a certain frequency and, for a value F of this frequency which is predetermined and related to the dimensions of the narrow channel E, and in particular to the ratio between its cross section and its length, the liquid mass flowing through this channel is caused to resonate and the support then exerts an excellent damping effect on the transmission of the oscillations from one of the frames to the other.

The improvement made by the present invention to the sleeves of the above kind makes it possible to "decouple" then with respect to certain high frequencies, namely to filter out directly certain vibrations of relatively high frequency and relatively low amplitude without causing any flow of liquid L through the narrow channel E.

In each case a vibrating valve is used for this purpose which is mounted so that:

its deflection movements are controlled by application of pressures on respectively two of its opposite surfaces, these surfaces are in direct contact with respectively the liquid volumes contained in the two chambers A and B, and the amplitude of said deflection movements is limited to a low value.

In the two sleeve and valve embodiments which have been illustrated, the first in FIGS. 1 and 2 and the second in FIGS. 3 to 5, the seat of the valve is carried by the median portion of the internal frame 1 and the same goes for the narrow channel E.

But the proposed constructions differ in both cases.

In the first case (FIGS. 1 and 2), a cylindrical ring of revolution 4 is fixed laterally to the outer face of the internal tube 1, or more precisely to a collar 5 surrounding the median portion of said tube, so that the axis of this ring 4 intersects the axis X and is oriented parallel to the direction Y, said ring 4 being immersed in chamber A.

The axial end of ring 4, which is the furthest away from axis X, forms a double seat for a valve 6, itself formed by a rigid circular disc.

In other words, valve 6 may move freely in direction Y between two rigid annular stops comprised respectively by ring 4 itself and by a cap 7 covering this ring and clipped thereto.

The dimensions of ring 4 and cap 7 are provide so that the amplitude of the deflection movements of valve 6 is limited to a low value, for example of the order of 0.5 mm.

The face of valve 6, the furthest away form axis X, is directly in contact with the liquid contained in chamber A.

To provide free communication of the liquid between chamber B and the other face of valve 6, an annular channel 8 of large section is provided along the median portion of tube 1, inside collar 5, which channel communicates with a cylindrical cavity 9 inside ring 4.

The diameter of this cavity 9 is itself sufficiently large so that no constricting phenomenon is imposed on the liquid between channel 8 and valve 6.

The narrow channel E is here formed by at least one passage formed radially in ring 4 and causing cavity 9 to communicate with chamber A.

The "high frequency decoupling" operation of such a sleeve is as follows.

When a low amplitude vibration (i.e. generally less than 0.5 mm) and of a respectively high frequency (i.e. greater than 15 Hz and for example of about 50, 100, 150 Hz) is applied to one of the two frames 1 and 2, it causes valve 6 to vibrate and this phenomenon is sufficient to provide a filtering effect preventing the transfer of the vibrations from the frame considered to the other frame.

If the amplitude of the vibrations considered exceeds the threshold value imposed by the stops at the end of travel of the valve, the liquid is forced to flow through the narrow channel E and the other damper operating mode of the sleeve, more especially reserved for low frequency oscillations, using the resonance of the liquid flowing through the narrow channel.

In the second embodiment which is illustrated in FIGS. 3 to 5, the valve is in the form of a cylindrical tile 10 extending along an arc of a circle and disposed jointingly in a complementary housing 11 formed inside the internal frame 1 concentrically to axis X, so as to be able to slide angularly in this housing.

The angular extend of this tile is between 90° and 180°, being preferably about 150°.

Two end of travel stops 12 and 13 are provided on frame 1 for limiting the amplitude of the angular deflection movements of tile 10.

The two angular ends of housing 11 open respectively into the two chambers A and B so that the two lateral edges of tile 10 are in direct contact with respectively the two liquid volumes L contained respectively in these two chambers A and B.

The narrow channel E is here defined by a groove in the form of an arc of a circle formed in the back of tile 10 and by the opposite wall of housing 11.

In the embodiment illustrated the internal tubular frame 1 is formed of three concentric tubes $1_1$, $1_2$, $1_3$, fitted jointingly into each other. The two inner tubes $1_1$ and $1_2$ are secured angularly together by a radial key 14 and the two outer tubes $1_2$ and $1_3$ both apertured so as to provide the desired communications and form housing 11, are secured together in any desirable way, particularly by means of at least one spot weld. The inner tube 1₁ serves as guide core for the internal face of tile 10 whereas the outer tube 1₃ serves as outer cage guiding the external face of said tile, the end of travel stops 12 and 13 being integral with the intermediate tube 1₂.

The "high frequency decoupling" operation of this sleeve is similar to the one described above except that the deflection movements of the preceding valve 6 are here replaced by the angular deflection movements of tile 10 about axis X, between the two ends of travel defined by stops 12 and 13, said tile here playing the role of a "valve": the two endmost angular positions occupied by said tile 10 during said deflection movements can be seen respectively in FIGS. 3 and 5.

Following which and whatever the embodiment adopted, antivibratory support sleeves are obtained whose construction and operation are sufficiently clear from the foregoing.

These sleeves have numerous advantages with respect to those known heretofore, in particular that of providing efficient "high frequency decoupling" without any risk of liquid leaking out of the sleeve at the level of the valve or its seat.

As is evident, and as is clear from the foregoing, the invention is in no wise limited to those of its modes of application and embodiments which have been more especially considered; it embraces, on the contrary, all variants thereof, particularly:

those in which the narrow channel connecting the two chambers A and B of the sleeve together is located in a part of the sleeve other than the median portion of the internal tubular frame, and those in which the valve of the first embodiment described with reference to FIGS. 1 and 2 is formed by the central portion of a sealed deformable membrane whose periphery is sealingly connected to its seat, the amplitude limitation of the deflection movements of such a membrane being provided by means other than stops, for example by an internal frame made from inextensible cloth.

I claim:

1. Hydraulic antivibratory support sleeve comprising two rigid tubular frames (1,2) one surrounding the other and joined together by an elastomer body (3) adhered thereto and adapted so as to form therewith at least two diametrically opposite sealed chambers (A, B) communicating together through a narrow channel (E), the whole of said chambers and said channel being filled with a damping liquid, characterized in that the median portion of its internal frame (1) comprises a rigid seat for a valve (6, 10), which valve has two opposite surfaces placed respectively in direct contact with the liquid volumes contained respectively in both chambers (A, B), means for limiting the amplitude of the deflection movements of this valve, a passage (11) in the form of a cylindrical tile whose axis coincides with that (X) of the internal frame (1) is formed in the median portion of this frame and in that a valve (10) in the form of a cylindrical tile is mounted so as to be able to slide angularly in this passage and to expose its two side edges respectively to the liquid volumes contained in the two chambers (A, B), and the narrow channel (E) is defined essentially by a groove extending along an arc of a circle and formed between the tile shaped valve (10) and its housing (11).

* * * * *